(12) United States Patent
Eriksen

(10) Patent No.: US 10,516,962 B2
(45) Date of Patent: Dec. 24, 2019

(54) MULTI-CHANNEL BINAURAL RECORDING AND DYNAMIC PLAYBACK

(71) Applicant: Huddly AS, Oslo (NO)

(72) Inventor: Stein Ove Eriksen, Oslo (NO)

(73) Assignee: HUDDLY AS, Oslo (NO)

( * ) Notice: Subject to any disclaimer, the term of this patent is extended or adjusted under 35 U.S.C. 154(b) by 0 days.

(21) Appl. No.: 15/643,374

(22) Filed: Jul. 6, 2017

(65) Prior Publication Data

US 2019/0014432 A1    Jan. 10, 2019

(51) Int. Cl.
| | | |
|---|---|---|
| H04S 7/00 | (2006.01) | |
| H04R 3/00 | (2006.01) | |
| H04R 5/027 | (2006.01) | |
| H04R 1/40 | (2006.01) | |
| H04R 5/033 | (2006.01) | |
| G11B 20/10 | (2006.01) | |
| G11B 20/00 | (2006.01) | |

(52) U.S. Cl.
CPC ........ *H04S 7/304* (2013.01); *G11B 20/00992* (2013.01); *G11B 20/10527* (2013.01); *H04R 3/005* (2013.01); *H04R 5/027* (2013.01); *G11B 2020/10546* (2013.01); *H04R 1/406* (2013.01); *H04R 5/033* (2013.01); *H04R 2420/07* (2013.01); *H04S 2400/01* (2013.01); *H04S 2400/15* (2013.01); *H04S 2420/11* (2013.01)

(58) Field of Classification Search
CPC .. H04S 7/304; H04S 2420/07; H04S 2400/01; H04S 2400/15; H04S 2420/11; H04R 1/406; H04R 3/005; H04R 5/027; H04R 5/033; H04R 2420/07; G11B 20/00992; G11B 20/10527; G11B 2020/10546
See application file for complete search history.

(56) References Cited

U.S. PATENT DOCUMENTS

| | | | | |
|---|---|---|---|---|
| 2009/0028347 | A1* | 1/2009 | Duraiswami | H04R 1/406 |
| | | | | 381/26 |
| 2016/0238842 | A1* | 8/2016 | Sendai | G02B 27/0176 |
| 2017/0295446 | A1* | 10/2017 | Thagadur Shivappa | |
| | | | | H04S 7/304 |
| 2017/0347193 | A1* | 11/2017 | Marrin | H04R 5/027 |
| 2018/0048961 | A1* | 2/2018 | Zhang | H04R 5/027 |

OTHER PUBLICATIONS

Vahedia et al., Estimation of Speaker Position Using Audio Information, 1997 IEEE TENCON, p. 183.*

* cited by examiner

*Primary Examiner* — Sonia L Gay
(74) *Attorney, Agent, or Firm* — Edgetech Law LLP

(57) ABSTRACT

Methods and systems are provided for enhanced audio experiences in VR/AR applications. The apparatuses of this disclosure are adapted to record multiple binaural stereo pairs and play back select binaural pairs corresponding to users' head positions. A substantially spherical microarray is utilized in various embodiments for recording multiple binaural stereo pairs. A VR/AR headset is further adapted to track a user's head positions and dynamically play back binaural sound pairs corresponding to the head positions.

15 Claims, 8 Drawing Sheets

MULTI-CHANNEL BINAURAL RECORDING AND DYNAMIC PLAYBACK

BACKGROUND OF THE DISCLOSURE

The present disclosure relates in general to audio recording and playback. Specifically, the present disclosure relates to apparatus and methods for providing enhanced virtual reality/augmented reality (VR/AR) audio experiences. More specifically, apparatus and methods are provided for multi-channel surround sound recording and binaural playback of the recorded sound.

Recordings have long been made using two main methods: mono and stereo. Mono uses a single microphone to pick up sound, while stereo uses two, spaced apart from one another. With the emergence and spread of VR/AR technologies in recent years, recordings are frequently made using more than two microphones. The resultant recording typically requires more than two speakers to play back. In some scenarios, mixing or signal processing is performed on the recording, and thereby the playback is made using only two speakers. Regardless of the number of speakers involved however, such "simulated" surround sound often leads to less than real or satisfactory listening experience to human ears. This is due in part to the intricacies of hearing or auditory perception by human ears, and particularly the sensitivity of hearing to the relative positions and orientation of the sound origin vis-à-vis a listener's head and ears.

Binaural recording has been utilized to improve sound recording and listening experience. However, a conventional "dummy head" with a set of pinnae have their own limits, as it would generally present one orientation or position. For example, if a listener's head position or orientation is not mimicked by the dummy head, the resulting sound would not generate as real or visceral a listening experience to the listener's ears. This is particularly an issue in VR/AR applications, as a slight defect in auditory perception may undercut the entire VR/AR experience as designed.

There is therefore a need for improved methods and systems to providing enhanced VR/AR audio experiences. More specifically, this is a need for apparatus and methods to improve surround sound recording and playback, taking into account of changing head positions and orientation.

SUMMARY OF THE VARIOUS EMBODIMENTS

It is therefore an object of this disclosure to provide methods and systems for enhanced VR/AR audio experiences corresponding to a user's or listener's head positions and angle.

Particularly, in accordance with this disclosure, there is provided, in one embodiment, a system for surround sound recording and binaural playback corresponding to at least two head positions of a user. The system comprises a substantially spherical microphone array adapted to record multiple binaural sound pairs; a multi-channel recording processor adapted to process the multiple binaural sound pairs thereby producing multiple pairs of binaural audio; a multi-channel playback processor adapted to retrieve a head position of the user, and process the multiple pairs of binaural audio based on the head position thereby reproducing a binaural sound pair corresponding to the head position; and a playback unit adapted to playback binaural sound pairs.

In another embodiment, the playback unit is one of a headphone and an earphone. In yet another embodiment, the headphone or the earphone is wireless.

In a further embodiment, the system further comprises a tracking unit connected to the multi-channel playback processor, and adapted to track head positions of a user.

According to another embodiment, the tracking unit is a virtual reality and augmented reality (VR/AR) headset.

According to yet another embodiment, the substantially spherical microphone array comprises a substantially spherical frame and a plurality of microphones affixed to the frame. Each of the plurality of microphones is paired with a microphone on an orthodrome at its opposite side for recording binaural sound pairs.

According to yet another embodiment, the diameter of each orthodrome of the frame is substantially the distance in-between a pair of human ears.

According to a further embodiment, the frame is made of rubber, silicone, metal, plastics, or a combination thereof.

In another embodiment, the substantially spherical microphone array comprises 18 microphones. In yet another embodiment, the substantially spherical microphone array comprises 32 microphones.

In a further embodiment, the multi-channel recording processor further comprises a multi-channel amplifier adapted to filter sound signals.

In accordance with this disclosure, there is provided, in another embodiment, an apparatus for binaural sound recording. The apparatus comprises a substantially spherical microphone array adapted to record multiple binaural sound pairs; and a multi-channel recording processor adapted to process the multiple binaural sound pairs thereby producing multiple pairs of binaural audio.

In accordance with this disclosure, there is provided, in yet another embodiment, a VR/AR system for providing enhanced audio experiences to a user. The system comprises a VR/AR headset adapted to track the user's head positions; the aforementioned apparatus; and a VR/AR ear set connected to the VR/AR headset and adapted to retrieve head positions of the user from the VR/AR headset. The VR/AR ear set is further adapted to receive the multiple binaural sound pairs and dynamically reproduce a binaural sound pair corresponding to the head position.

In another embodiment, the VR/AR headset and VR/AR ear set are physically joined. In yet another embodiment, the VR/AR headset and VR/AR ear set are wirelessly connected.

In accordance with this disclosure, there is provided, in a further embodiment, a method for dynamically playing back binaural audio streams based on head positions of a user. The method comprises processing multiple pairs of binaural audio from binaural recording of surround sound corresponding to different head positions; retrieving a head position of the user; and outputting a binaural sound pair corresponding to the head position.

In another embodiment, the method further comprises recording multiple binaural sound pairs using a substantially spherical microphone array; and generating multiple pairs of binaural audio. In yet another embodiment, the multiple binaural sound pairs comprise 9 channels. In a further embodiment, the multiple binaural sound pairs comprise 16 channels.

DETAILED DESCRIPTION OF THE VARIOUS EMBODIMENTS

The recording and playback systems of this disclosure are adapted to record multiple binaural stereo pairs and play back select binaural pairs corresponding to user's head positions. The binaural surround sound recording and dynamic playback methods in various embodiments enhance surround sound audio experience of a user in VR/AR applications.

Binaural Sound Recording

Figure 1:
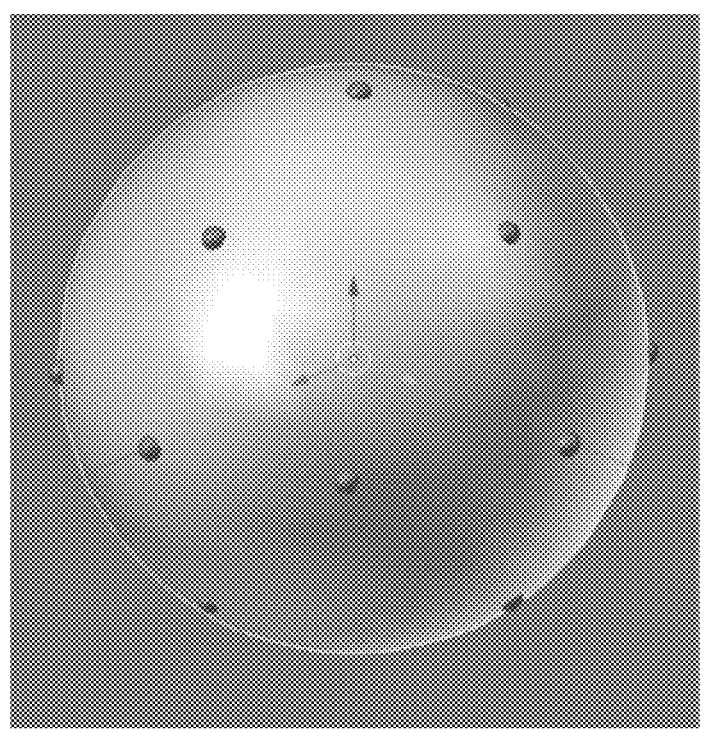
FIG. 1 depicts a substantially spherical microphone array according to one embodiment of this disclosure.

An exemplary system of this disclosure includes a spherical microphone array for collecting sound in the vicinity of each microphone in the array. The spherical microphone array in one embodiment comprises a substantially spherical frame and a plurality of microphones affixed to the frame. Referring to FIG. 1, the spherical frame is shown in a three-dimensional (3-D) perspective view. On the outer-surface of the spherical frame are affixed a plurality of microphones. The microphones are shown as protrusions dubbed over the entire surface of the sphere. Each microphone is positioned, and thus trackable, in a 3-D coordinate system. The 3-D coordinate system is a spherical coordinate system in one embodiment, and a 3-D cartesian coordinate system in an alternative embodiment. An illustration of the 3-D coordinate system is shown in the center of the spherical frame in FIG. 1.

Figure 3:
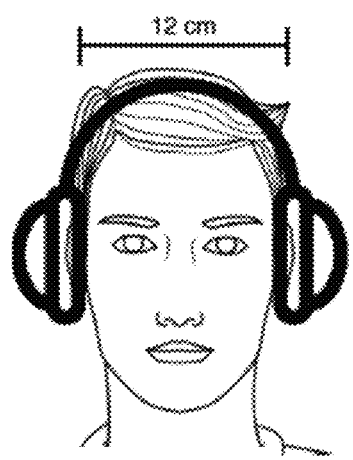
FIG. 3 shows a headphone playback unit according to another embodiment.
Figure 4:
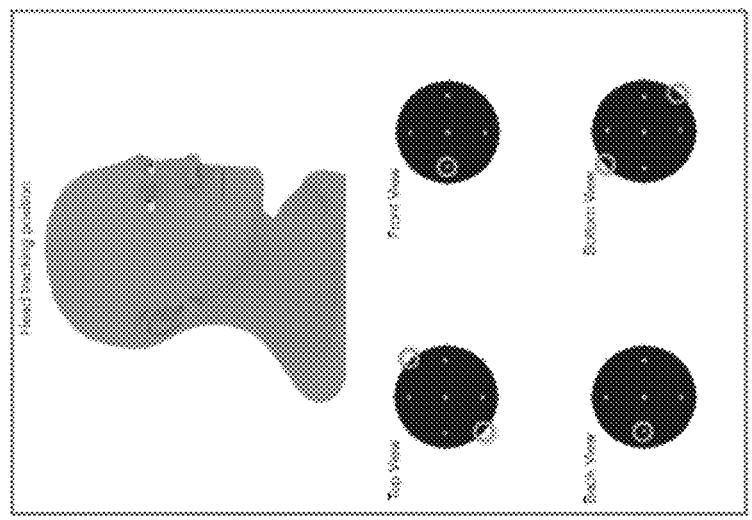
FIG. 4 illustrates on the top certain head positions, and on the bottom the corresponding pairs of microphones viewed from different angles on a substantially spherical frame according to one embodiment.
Figure 4:
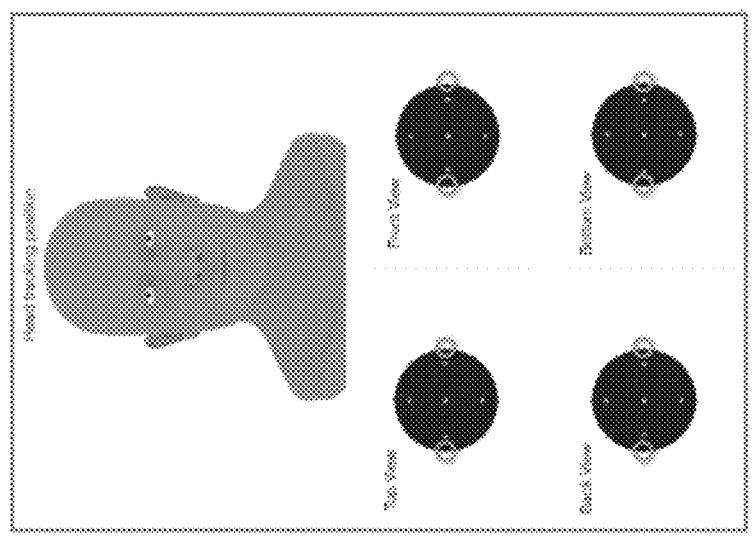
Figure 4:
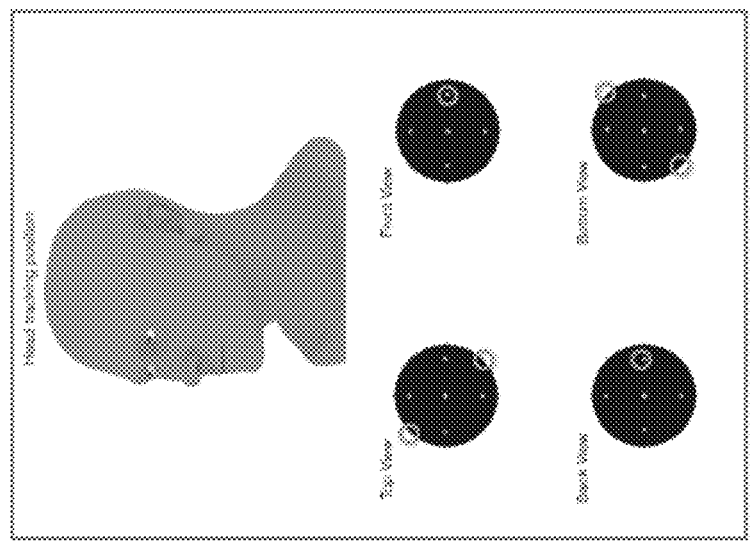
Figure 5:
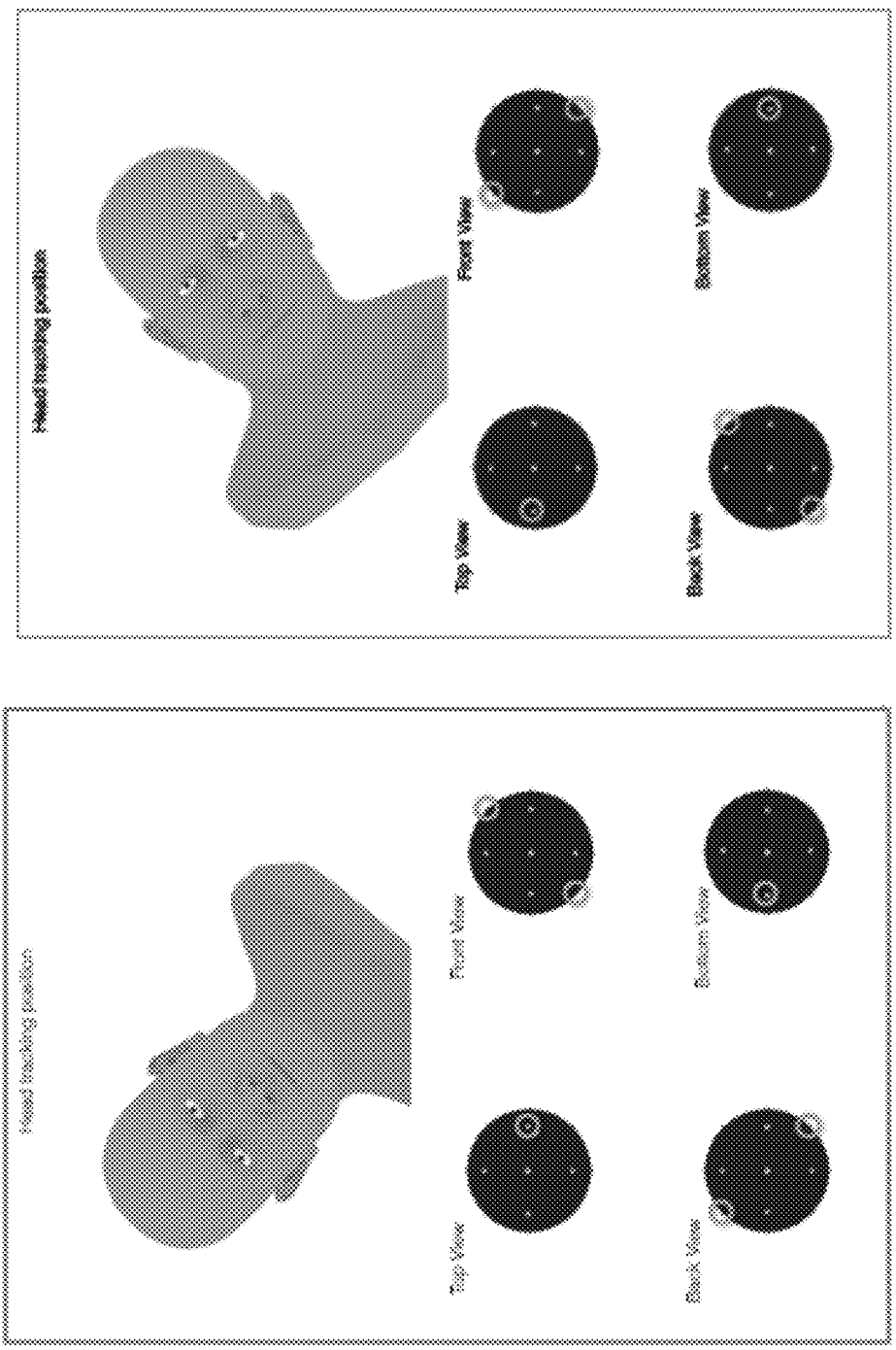
FIG. 5 illustrates on the top certain other head positions, and on the bottom the corresponding pairs of microphones viewed from different angles on a substantially spherical frame according to another embodiment.
Figure 6:
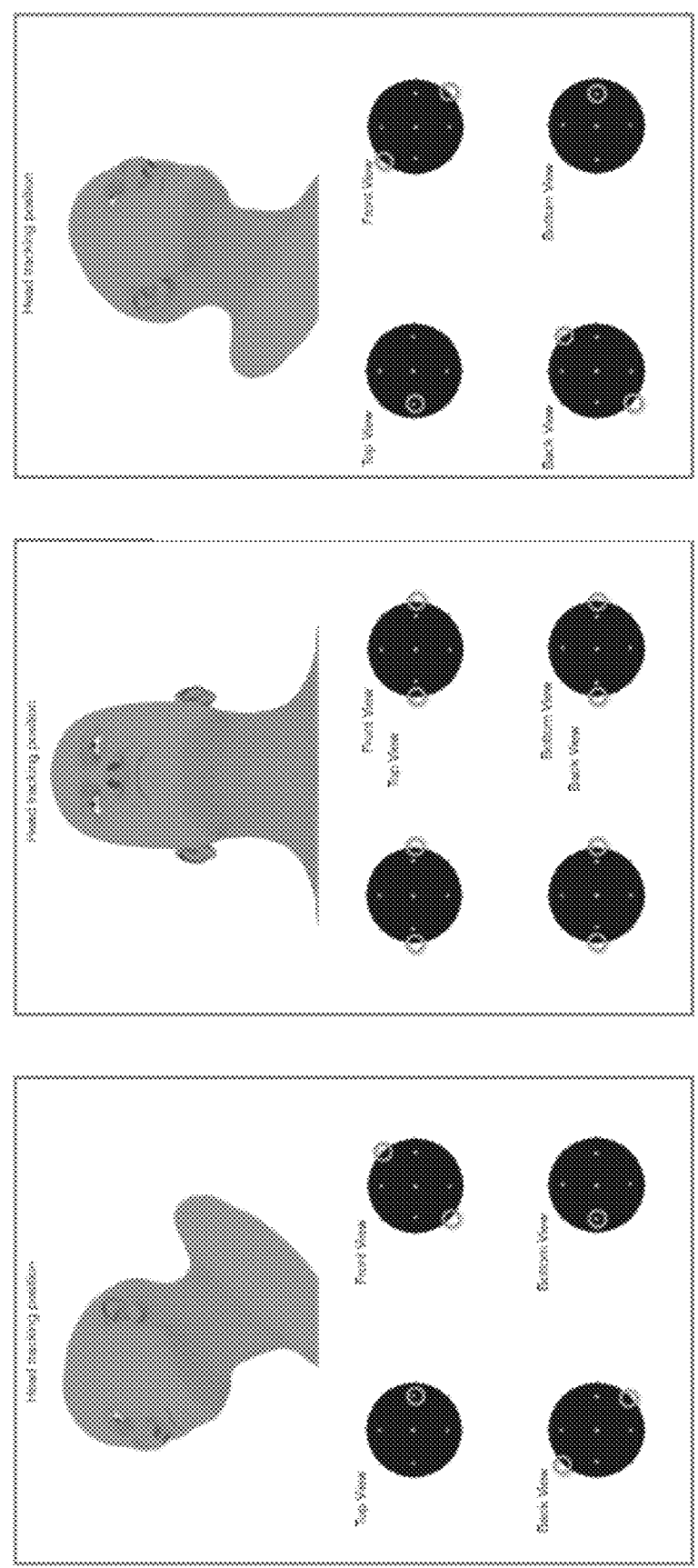
FIG. 6 illustrates on the top certain additional head positions, and on the bottom the corresponding pairs of microphones viewed from different angles on a substantially spherical frame according to another embodiment.
Figure 7:
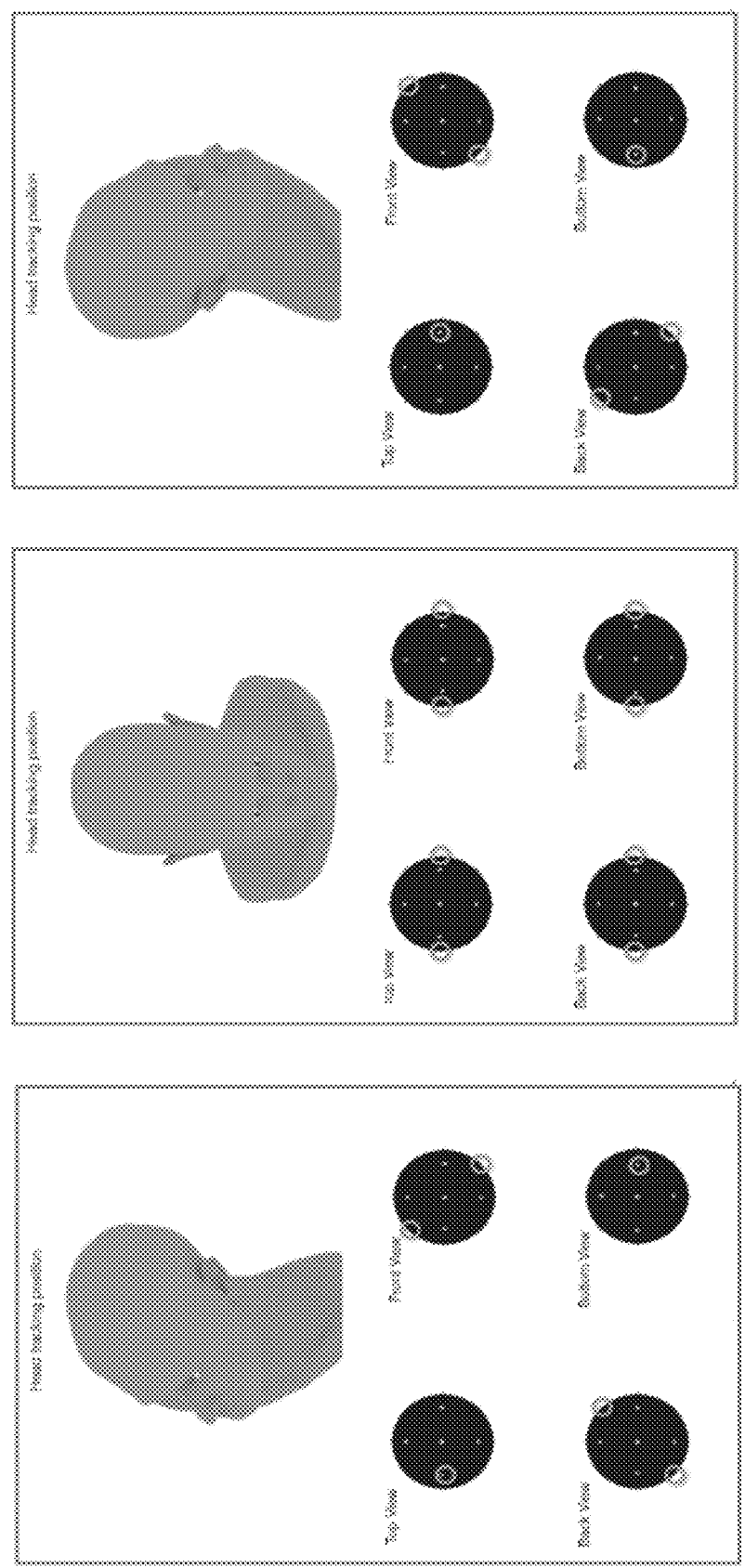
FIG. 7 illustrates on the top certain further head positions, and on the bottom the corresponding pairs of microphones viewed from different angles on a substantially spherical frame according to one embodiment.

Each of the plurality of microphones is paired with a microphone on an orthodrome at its opposite side according to one embodiment. Each microphone pairs are designed to record binaural sound pairs for the corresponding orientation or angle of a user's head, where the distance in-between the two paired microphones is substantially the same as the distance in-between the ears. That is, the diameter of each orthodrome of the spherical frame is substantially equal to the distance in-between a pair of human ears. Referring to FIG. 3, the distance in-between a pair of human ears in one embodiment is 12 cm. In alternative embodiments, variations are provided to accommodate different head sizes or ear distances in the population of users.

Figure 2:
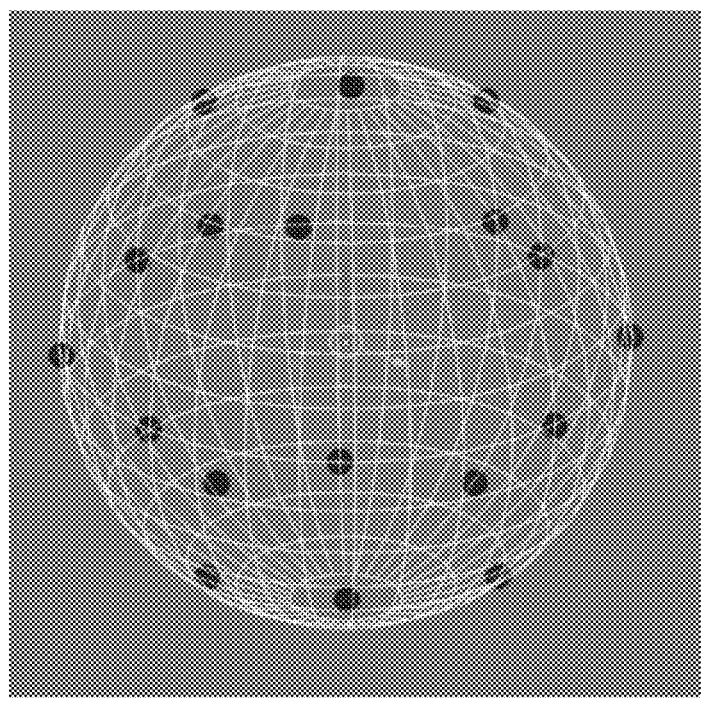
FIG. 2 depicts in a transparent view of a substantially spherical microphone array according to one embodiment.

Referring to FIG. 2, an example of the placement of microphones on the spherical frame is shown in another illustration. A 3-D coordinate system is depicted as well at the center of the spherical frame. Each microphone in the spherical microphone array is addressable or trackable by its coordinates in the 3-D coordinate system; e.g., (a, b, c) in a 3-D cartesian coordinate system according to one embodiment, or (r, θ, φ) in a spherical coordinate system according to another embodiment.

The spherical frame is made of rubber, silicone, metal, plastics, or other composite materials in various embodiments. Microphones affixed on the spherical frame are of a variety of specifications suitable for various recording environment.

Referring to FIGS. 4-7, the positions of the microphones on the spherical frame are mapped to different orientations of a human head, including for example, from front facing to rear facing, from left side facing to right side facing, from upward facing to downward facing, as well as obliquely upward facing or obliquely downward facing orientations. These positions are tracked specifically using 3-D coordinates as discussed above.

In the exemplary arrangement shown in FIG. 2, 18 microphones are affixed on the spherical frame. The microphone array thus may record up to 9 channels of binaural audio. The number of microphones may be varied depending on the design of the microphone array in various embodiments. In an alternative embodiment, 32 microphones are affixed on the spherical frame, and up to 16 channels of binaural audio may be produced.

The system of this disclosure in addition includes a multi-channel recording processor, connected to the spherical microphone array. The multi-channel recording processor is adapted to produce multiple pairs of binaural audio from the collected sound signals of the microphone array. The multi-channel recording processor in one embodiment includes a multi-channel (e.g., in a number of N pairs) preamplifier for filtering the sound signals to generate n pairs of audio streams. The recording processor further includes a data acquisition card for sampling in another embodiment.

The resulting surround binaural sound from the multi-channel recording processor is capable of being played-back dynamically by the system of this disclosure, as discussed below.

Dynamic Playback

The recording and playback system of this disclosure is capable of binaural playback of the multi-channel surround sound recording in one embodiment. The multi-channel surround sound is dynamically rendered for the listener, delivering to the listener who may be rotating or moving his or her head in the surround sound field a pair of binaural sounds that matches his or her head positions or orientation. This enhances and improves audio experience for VR/AR applications.

For dynamic playback, the system of this disclosure includes a playback unit and a multi-channel playback processor. The playback unit is adapted to playback binaural sound pairs. In various embodiments, the playback unit is a headphone or earphone of various designs, whether wired or wireless. The playback unit is a VR/AR headset in certain embodiments. In an alternative embodiment, the playback unit includes multiple pairs of speakers configured for surround sound effect in a space.

Figure 8:
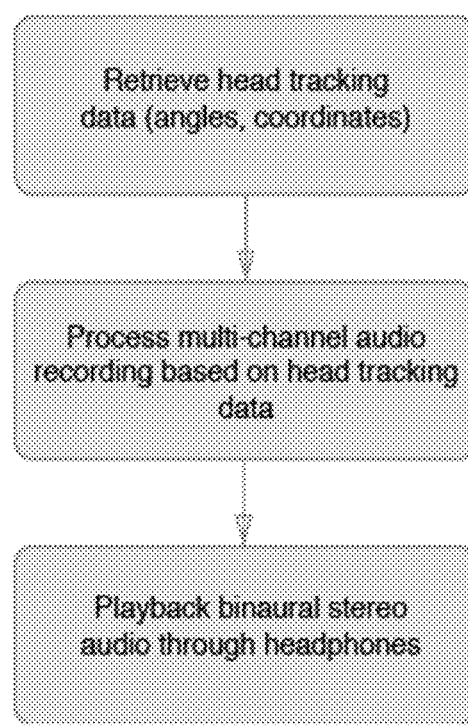
FIG. 8 outlines a method for playing back binaural sound pairs according to one embodiment.

The playback unit is connected to the multi-channel playback processor of this disclosure. In a certain embodiment, the playback unit and the playback processor are physically joined. The multi-channel playback processor is adapted to retrieve a head position of the user, and process the multiple pairs of binaural audio based on the head position, and thereby reproducing a binaural sound pair corresponding to the head position. This process of dynamic playback is outlined in FIG. 8.

Specifically, the playback processor of this disclosure is configured to perform a joint processing of the audio data and head position data (e.g., position and angle of the listener's head). In one embodiment, the playback processor further includes a tracking unit adapted to track head positions and orientation in a 3-D coordinate system. The 3-D coordinate system is a 3-D cartesian coordinate system in one embodiment, and a 3-D spherical system in another embodiment. The tracking unit may be hardware, software, firmware, or a combination thereof in various embodiments. In a certain embodiment, the tracking unit is a VR/AR headset with a tracking camera. In another embodiment, the tracking unit is a smartphone or smart camera device with a gyroscope.

The method of dynamic playback according to one embodiment is based on relating or comparing the coordinates or referencing points in the tracking unit's 3-D coordinate system to the coordinates or reference points in the spherical microphone array's 3-D coordinate system. Corresponding head positions as defined by one or a set of coordinates are retrieved, and then matched to the respective microphone pairs in the spherical microphone array based on their 3-D coordinates. In alternative embodiments, the microphone pairs and the head positions may be substantially or approximately matched based on the available microphone pairs.

The playback unit then receives the matched coordinates data, and playback binaural sound pairs based on the matched coordinates.

VR/AR System with Enhanced Audio

The systems and methods for surround sound recording and binaural playback in this disclosure may be advantageously employed in VR/AR applications.

In one embodiment, a VR/AR system with enhanced audio is provided, which includes a VR/AR headset adapted to track the user's head positions, a VR/AR ear set connected to the VR/AR headset and adapted to retrieve head positions of the user from the VR/AR headset, and a binaural recording apparatus with a spherical microphone array. The VR/AR ear set is adapted to receive multiple binaural sound pairs and dynamically reproduce a binaural sound pair corresponding to the head position. In an alternative embodiment, the VR/AR headset and the VR/AR ear set are configured jointly as one device.

In a VR setting, the dynamic rendering by the system of the approximately matched binaural audio pair gives the listener an audio experience that corresponds to and validates the visual experience, thereby delivering a total immersive VR experience as the user rotates his or her head and moves in the space where the multi-channel surround sound recording was made.

According to a certain embodiment, pre-calibration is performed on the VR/AR system. For example, the multi-channel playback processor first calibrates and build a map of the listener's head orientations that correspond to the microphone pairs' coordinates in the spherical microphone array. The playback processor then detects the head orientation or positions. It retrieves the two soundtracks recorded by the microphone pairs that match the current or then-current positions of the head orientation or position, and sends the corresponding pair of recordings to the playback unit—the VR headphone or ear set in one embodiment—for playback.

The binaural surround sound recording is achieved by the recording system of this disclosure in another embodiment with multiple spherical arrays strategically positioned in a VR surround sound space.

The descriptions of the various embodiments, including the drawings and examples, are to exemplify and not to limit the invention and the various embodiments thereof.

I claim:

1. A system for surround sound recording and binaural playback corresponding to at least two head positions of a user, comprising:
   a substantially spherical microphone array adapted to record multiple binaural sound pairs;
   a multi-channel recording processor adapted to process the multiple binaural sound pairs thereby producing multiple pairs of binaural audio;
   a multi-channel playback processor adapted to retrieve a head position of the user, and relate coordinates of the multiple pairs of binaural audio to coordinates of the head position thereby reproducing a binaural sound pair corresponding to the head position; and
   a playback unit adapted to playback the binaural sound pair, wherein the substantially spherical microphone array comprises a substantially spherical frame and a plurality of microphones affixed to the frame, wherein each of the plurality of microphones is paired with a microphone on an orthodrome at its opposite side for recording binaural sound pairs.

2. The system of claim 1, wherein the playback unit is one of a headphone and an earphone.

3. The system of claim 2, wherein the one of a headphone and an earphone is wireless.

4. The system of claim 1, wherein the multi-channel playback processor further comprises a tracking unit adapted to track head positions of a user in a 3-D coordinate system.

5. The system of claim 4, wherein the tracking unit is a virtual reality and augmented reality (VR/AR) headset.

6. The system of claim 1, wherein the diameter of each orthodrome of the frame is substantially the distance in-between a pair of human ears.

7. The system of claim 6, wherein the frame is made of at least one of rubber, silicone, metal, and plastics.

8. The system of claim 6, wherein the substantially spherical microphone array comprises 18 microphones.

9. The system of claim 6, wherein the substantially spherical microphone array comprises 32 microphones.

10. The system of claim 1, wherein the multi-channel recording processor further comprises a multi-channel amplifier for filtering sound signals to generate multiple pairs of audio streams, and a data acquisition card for sampling sound signals.

11. An apparatus for binaural sound recording, comprising: a substantially spherical microphone array adapted to record multiple binaural sound pairs; and a multi-channel recording processor adapted to process the multiple binaural sound pairs thereby producing multiple pairs of binaural audio, wherein the substantially spherical microphone array comprises a substantially spherical frame and a plurality of microphones affixed to the frame, wherein each of the plurality of microphones is paired with a microphone on an orthodrome at its opposite side for recording binaural sound pairs, and wherein the plurality of microphones comprises 18 microphones.

12. An apparatus for binaural sound recording, comprising: a substantially spherical microphone array adapted to record multiple binaural sound pairs; and a multi-channel recording processor adapted to process the multiple binaural sound pairs thereby producing multiple pairs of binaural audio, wherein the substantially spherical microphone array comprises a substantially spherical frame and a plurality of microphones affixed to the frame, wherein each of the plurality of microphones is paired with a microphone on an orthodrome at its opposite side for recording binaural sound pairs, and wherein the plurality of microphones comprises 32 microphones.

13. A method for dynamically playing back binaural audio streams based on head positions of a user, comprising: recording multiple binaural sound pairs using a substantially spherical microphone array; generating multiple pairs of binaural audio; relating coordinates of multiple pairs of binaural audio from binaural recording of surround sound to coordinates of different head positions; retrieving a head position of the user; and outputting a binaural sound pair corresponding to the head position based on the related coordinates, wherein the substantially spherical microphone array comprises a substantially spherical frame and aslurality of microphones affixed to the frame, wherein each of the plurality of microphones is paired with a microphone on an orthodrome at its opposite side for recording binaural sound pairs.

14. The method of claim 13, wherein the multiple binaural sound pairs comprise 9 channels.

15. The method of claim 13, wherein the multiple binaural sound pairs comprise 16 channels.

\* \* \* \* \*